July 5, 1927.

A. M. BABCOCK

SPRING MOTOR

Filed June 4, 1926

Inventor
A. M. Babcock

By Clarence A. O'Brien
Attorney

July 5, 1927.

A. M. BABCOCK 1,634,864

SPRING MOTOR

Filed June 4, 1926

Inventor
A.M.Babcock

By Clarence A O'Brien
Attorney

July 5, 1927.

A. M. BABCOCK

SPRING MOTOR

Filed June 4, 1926

Inventor
A. M. Babcock

By Clarence A. O'Brien
Attorney

July 5, 1927.

A. M. BABCOCK

SPRING MOTOR

Filed June 4, 1926  4 Sheets-Sheet 4

1,634,864

Inventor
A. M. Babcock
By Clarence A. O'Brien
Attorney

Patented July 5, 1927.

1,634,864

UNITED STATES PATENT OFFICE.

ASA M. BABCOCK, OF LORAIN, OHIO.

SPRING MOTOR.

Application filed June 4, 1926. Serial No. 113,731.

This invention relates to improvements in spring motors and particularly to a motor of this type having means for re-winding the springs through the use of air pressure operated mechanism.

An object of this invention is to provide a spring motor wherein a plurality of spring drums are continuously operable to drive a driven shaft for producing power adapted for use in any desired manner, together with an air driven mechanism operable to rewind the springs in all of the drums to insure continuous operation of the driven shaft.

A further object of the invention resides in providing a plurality of spring driven drums operable to drive a driven shaft with an air driven rewinding mechanism having suitable means for controlling the connection of the rewinding mechanism with the drums whereby the winding mechanism will be automatically connected in successive relation with the springs in the driving drums in order to maintain the same in wound condition.

The invention includes numerous other objects residing in the details of construction and arrangement of the parts for carrying the invention which are more particularly pointed out in the following detailed description, and in the claims directed to a preferred form of the invention, it being understood, however, that various changes in the size, shape and arrangement of these parts may be made without departing from the spirit and scope of the invention as herein set forth.

In the drawings forming a part of this application:—

Figure 1:
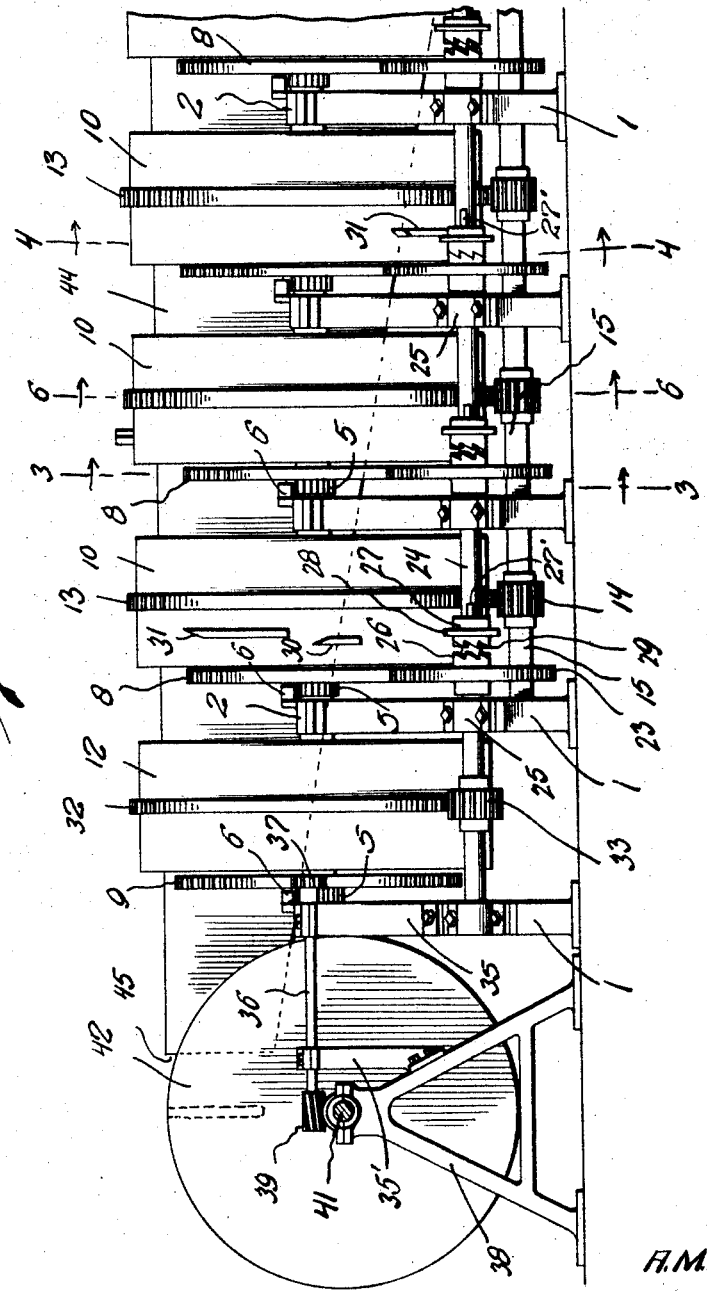
Figure 1 is a side elevation of an assembled spring motor constructed in accordance with this invention.
Figure 5:
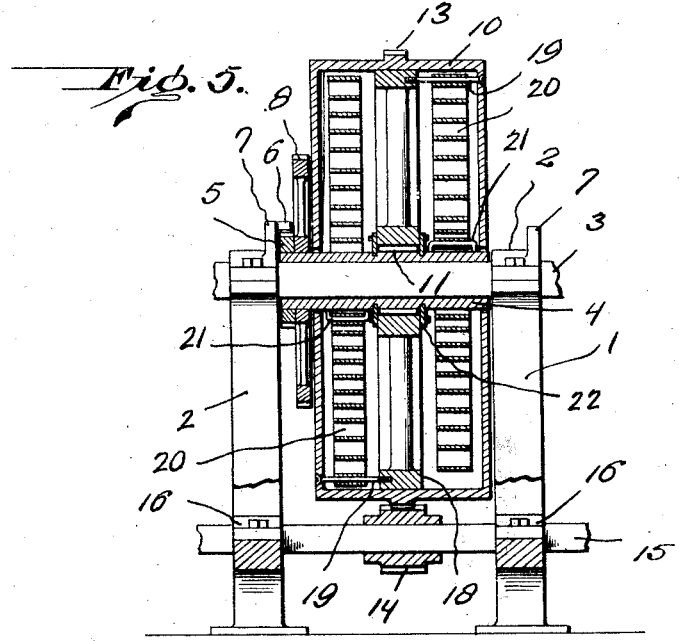
Fig. 5 is a sectional view taken on the line 5—5 of Fig. 4.

1 indicates a plurality of bearing supports which are formed with sectional bearings 2 mounting a bearing shaft 3 in the alined bearing openings formed in the supports 2 which in turn rotatably mounts thereon a plurality of rotatable sleeve members 4 disposed between the bearing supports 2. These sleeves 4 are each provided at one end with a ratchet gear 5 as shown in Figs. 1 and 5, with which cooperates a pawl 6 mounted on a suitable extension 7 carried by the bearing structures 2 of the supporting members 1. This prevents the sleeves 4 from rotating in one direction, but permits rotation in an opposite direction.

Adjacent to the ratchet gear 5, each of the sleeves 4 mounts a driven gear 8 with the exception of the sleeve of the structure at the left hand end of Fig. 1, which mounts a driven gear 9, of larger diameter than the gears 8 on the remaining sleeves. A plurality of driving drums 10 are rotatably mounted on the sleeve 4 thru the medium of the roller bearings 11 while a driving drum 12 similar to the drum 10 which is hereafter termed the winding drum, is mounted between the supports 1 at the left hand end of Fig. 1, and rotatably supported on the sleeve 4 in the same manner as the drum 10.

The driving drums 10 are provided with annular gears 13 on the periphery thereof which in turn intermesh with the driven gears 14 on the driven shaft 15 rotatably supported in the supports 1 in suitable bearings indicated at 16 in Fig. 5.

Figure 6:
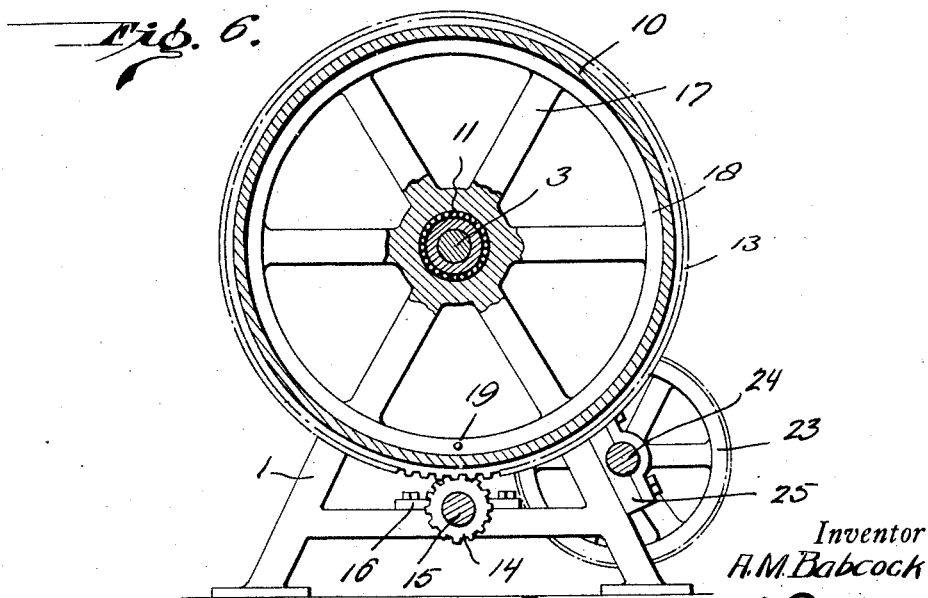
Fig. 6 is a sectional view taken on the line 6—6 of Fig. 1.

A suitable spider 17 having a rim 18 at the outer periphery thereof serves to support the drums 10 and winding drums 12 for rotation on the sleeve 4 through the bearing 11, as clearly shown in Figs. 5 and 6. Suitable anchor bolts 19 are secured at diametrically opposite points on each side of the rim 18 of the spider and serve to anchor one end of a pair of coiled springs 20 within each drum 10 as well as the winding drum 12 by which energy is stored within each drum for driving the driven shaft 15 in a manner which will be described. The opposite ends of these spiral springs 20 are anchored to suitable anchor members 21 suitably secured to the sleeves 4 as clearly shown in Fig. 5 of the drawings, while suitable retaining plates 22 retain the bearing members of the bearing structure 11 in place in the hub of the spider.

The spur gears 8 are intermeshed with suitable winding gears 23 mounted on the winding shaft 24 rotatably mounted in the bearings 25 carried by the supporting members 1, said winding gears 23 being rotatable on the shaft 24 and provided with clutch teeth on one end of a collar extension on said gear as shown at 26. A clutch member 27 formed with an annular flange 28 and clutch teeth 29 adapted to cooperate with the teeth 26 is rotatable with the shaft 24 and slidable thereon so that there will be one collar provided for each winding gear adapted for control in a manner to be described for engagement with the clutch teeth on the winding gear in order to drive said gear and wind the springs in said drums. The slidable mounting of the member 27 on shaft 24 is made through the provision of a suitable keyway or the like as known in the art and indicated at 27' in Fig. 1.

These gears and movable clutch members 27 are provided for each of the drums 10 which have the peripheries thereof formed with operating cams 30 and 31 adapted to engage the flange 28 of a respective member 27 in order to periodically engage and disengage the clutch member 27 from the clutch teeth 26 on the winding gear 23 so that the springs within a particular drum will be wound a predetermined amount upon each revolution of the drum. The operating cams 30 and 31 for the clutch member 27 are offset about the peripheries of the drums 10 in order that only one drum will wind at a time.

The winding drum 12 is similar in construction to the drum 10 with respect to the manner of mounting the springs and other elements as is shown in Fig. 5, and is provided on a periphery with a ring gear 32 similar to the gears 13 on drums 10 but which intermeshes with the gear 33 mounted on the winding shaft 24 in order that the operation of the winding drum 12 will rotate the winding shaft 24 for purposes which will be described.

Figure 2:
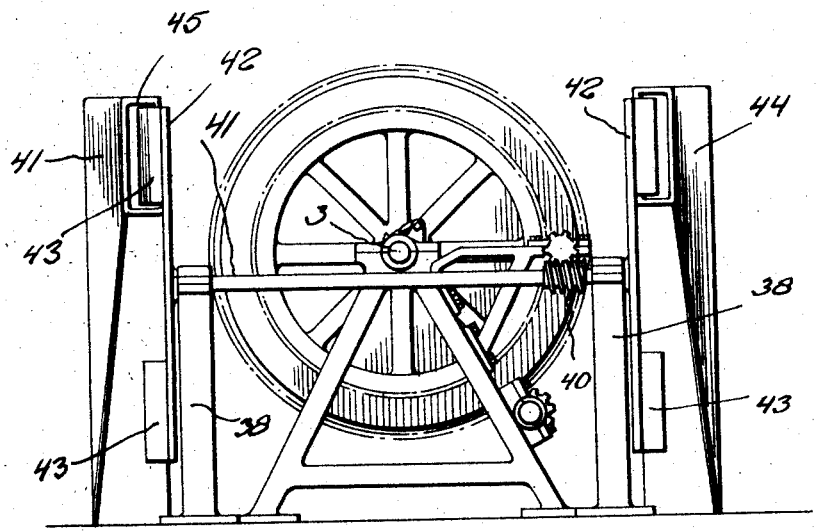
Fig. 2 is a rear end elevation of the improved spring motor.
Figure 3:
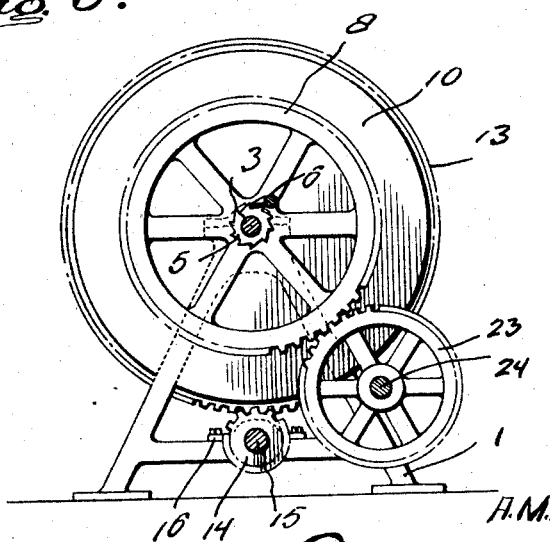
Fig. 3 is a vertical transverse sectional view taken on the line 3—3 of Fig. 1.
Figure 4:
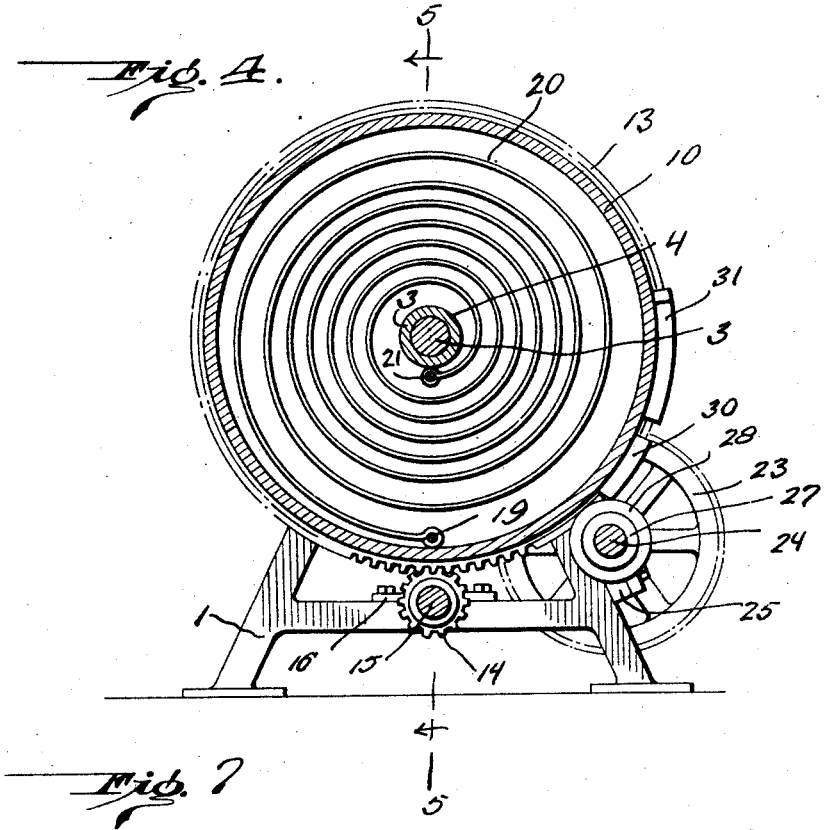
Fig. 4 is a vertical sectional view taken on the line 4—4 of Fig. 1.
Figure 7:
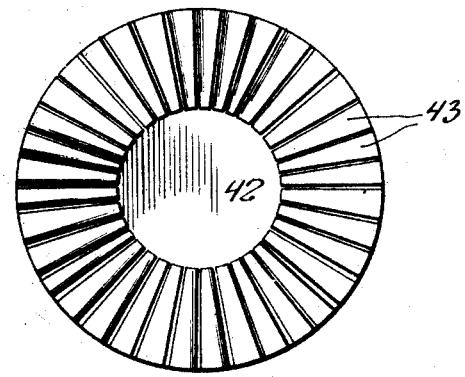
Fig. 7 is a detail elevation of one of the rotor members.
Figure 8:
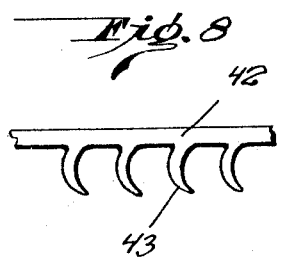
Fig. 8 is a plan view of a section of the rotor member shown in Fig. 7, showing the general construction of the blades formed thereon.

A suitable bearing bracket is detachably mounted on the end support 1 at the left hand end of Fig. 1, as indicated by the numeral 35 and is formed with a bearing portion rotatably receiving the drive shaft 36 carrying the spur gear 37 intermeshing with gear 9 in order that the gear 9 may be driven through the operation of the shaft 36 to wind the spring within the winding drum. The opposite end of the shaft 36 is rotatably supported in the bearing bracket 35' removably connected to the supporting member 38 while the free end carries the worm 39 driven by the worm gear 40 on the shaft 41 which is rotatably mounted adjacent its ends in the supports 38 as clearly shown in Fig. 2, and which carries the turbine members 42 preferably in the form of disks provided on one face with suitable buckets 43. These turbine disks may be constructed in any desired manner known to the art for the construction of turbines of the impulse type which may be particularly adaptable to use with air pressure construction.

Suitable funnel members 44 have small ends 45 forming nozzles positioned to discharge the air therefrom in the proper relation against the buckets 43 for driving the turbine disks 42 while the opposite ends of the funnels are tapered toward the forward end of the motor to the right hand of Fig. 1 where the forward enlarged ends receive the blast of air which is confined through the successive reduction in size of the funnel, and discharged at the small rear end for expansion and impact against the buckets on the disks 42.

With this construction as long as air is supplied to the disks 42 by the funnel for rotating said disks, the shafts 41 will be rotated for driving the shaft 36 thru the worm gear connections therewith, which in turn operate the gear 9 and wind the springs in the winding drum 12. Back motion is prevented by the pawl and ratchet mechanism heretofore described, so that the tension of the springs within the winding drums 12 are applied to the rotation of said drum which drives the gear 33 on the winding shaft 24 and rotates the said winding shaft. This rotation of the winding shaft is imparted to one of the drums 10 substantially continuously through the positioning of the operating cams 30 and 31 on the peripheries of each drum which alternately connects the winding gears for one of the drums 10 with the winding shafts so that the gear 8 for the respective drum is rotated in rotating the sleeve 4 and in turn winding the springs within the drum, while the drum is continuously rotatable to drive the driven shaft 15 through the gear 14.

In the construction as shown in Fig. 1, the cams 30 and 31 are positioned as they will appear in using a construction employing six drums similar to the drums 10 and in which a portion of the drums has been omitted as being unnecessary on account of repetition in illustration. The pawl and ratchet gears on the sleeves 4 prevent unwinding of the springs other than through the rotation of the drums 10. In this way, it will be seen that power may be stored within the drums 10 and continuously and evenly supplied to the driven shaft 15 which may be controlled by a suitable governor mechanism not shown, of which numerous forms are well known in the art, while the winding mechanism may operate at a variable speed due to variations in the air pressure used to rotate the disks 42. In this way, an intermittent source of power may be used for the purpose of supplying uniform power in order to operate desired machinery or other elements at a uniform speed.

Having thus described my invention, what I claim as new is:—

1. A spring motor, comprising a support, a plurality of shafts mounted in said support for independent rotation in one direction only, a plurality of driving drums mounted on said shafts for independent rotation, a driven shaft rotatable in said support and having driving connection with said driving drums, and means operable to independently rotate the first mentioned shafts to wind the springs in said drums in a predetermined manner.

2. A spring motor, comprising a support, a plurality of shafts mounted in said support for independent rotation in one direction only, a plurality of driving drums mounted on said shafts for independent rotation, a driven shaft rotatable thereon in said support and having driving connection with said driving drums, spring operated winding means for intermittently rotating said first mentioned shafts in a predetermined manner, and power operated means for operating the last named means.

3. A spring motor, comprising a support, a plurality of shafts mounted in said support for independent rotation in one direction only, a plurality of driving drums mounted on said shafts for independent rotation thereon, a driven shaft rotatable in said support and having driving connection with said driving drums, a winding shaft rotatable in said support in one direction only, a winding drum rotatable on said winding shaft, spring members connected with said first mentioned shafts and drums and housed by said drums, spring members connected with the winding shaft and winding drum, means connecting said winding drum intermittently with the first mentioned rotary shafts in predetermined sequence for winding the springs in the driving drums, and fluid operated means for rotating the winding shaft to wind the spring in the winding drum.

4. A spring motor, comprising a support, a plurality of shafts rotatably mounted in axially alined relation in said support for independent rotation in one direction only, a plurality of driving drums rotatable on said shafts independent thereof, a winding drum rotatable on one of said shafts, spiral springs connected with said shafts at one end and the winding drum and said driving drums respectively at the opposite ends and independently operable within each of said drums for operating the same, a driving shaft having a driving connection with said winding drums, and rotatable in said support, means on said driving shaft providing driving connection between the winding drum and the rotatable shafts mounting said driving drums controlled by the operation of said driving drums to independently and selectively drive said shafts to wind the springs in said driving drums, and fluid operated means for winding the springs in the winding drum.

In testimony whereof I affix my signature.

ASA M. BABCOCK.